United States Patent Office 3,341,489
Patented Sept. 12, 1967

3,341,489
ELASTOMERIC ORGANOPOLYSILOXANE COMPOSITIONS CONTAINING UNSATURATED ALKOXY SILANES
Verne G. Simpson, Scotia, N.Y., assignor to General Electric Company, a corporation of New York
No Drawing. Filed Sept. 28, 1962, Ser. No. 227,081
11 Claims. (Cl. 260—37)

The present invention relates to organopolysiloxane compositions, to an improved method for making organopolysiloxane elastomers, and to the elastomers derived thereby.

Organopolysiloxane elastomers are generally recognized for their ability to resist change at elevated temperatures over extended periods of time. Unlike conventional organic elastomers, however, organopolysiloxane elastomers require a subsequent oven cure to achieve optimum elastomer properties after the elastomer has been fabricated to a desirable shape. Post-curing of organopolysiloxane elastomers has been found to improve the tensile strength and chemical stability of the elastomer. The subsequent oven cure, however, often can exceed 24 hours or more at temperatures of 250° C. or higher. As a result, the production of organopolysiloxane elastomers is rendered economically less attractive.

The present invention is based on the discovery that if a certain olefinically unsaturated organosilicon material, such as vinyltriethoxysilane, is employed in minor amounts in an organopolysiloxane compositon convertible to the cured, solid, elastic state, the resulting composition can be directly fabricated to valuable elastomeric products without the necessity of an extended post-cure. The employment of a conventional fabrication technique such as compression molding, or hot air vulcanization, has been found to be sufficient to convert the organopolysiloxane composition to an elastomer having both a predetermined shape and optimum properties.

In accordance with the present invention there is provided an organopolysiloxane composition comprising by weight, (A) 100 parts of an organopolysiloxane polymer having a viscosity of at least 100,000 centipoises at 25° C. of the forumla, (1) 

(B) 10 to 300 parts of a filler, and (C) 0.1 to 10, and preferably 0.2 to 5, parts of an olefinically unsaturated organosilicon material selected from a silane having the formula, (2) 

and a cyclic silane ester having the formula, (3) 

where R is a member selected from monovalent hydrocarbon radicals, halogenated monovalent hydrocarbon radicals, and cyanoalkyl radicals, R' is an olefinically unsaturated monovalent hydrocarbon radical, R'' is a member selected from hydrogen, and monovalent hydrocarbon radicals free of olefinic unsaturation, R''' is a divalent aliphatic radical, X is a member selected from alkoxy radicals, alkoxyalkoxy radicals, alkoxyaryloxy radicals, acyloxy radicals, and halogen radicals, Y is a member selected from R'' radicals and X radicals, $a$ is equal to from 1.95 to 2.01, inclusive, $b$ is a whole number equal to from 0 to 2, inclusive, $c$ is an integer equal to from 1 to 3, inclusive, and the sum of $b$ and $c$ is equal to 3, and $n$ is an integer equal to from 1 to 10, and preferably from 1 to 3, inclusive.

Radicals included by R of Formula 1 are aryl radicals, and halogenated aryl radicals such as phenyl, chlorophenyl, xylyl, tolyl, etc.; aralkyl radicals such as phenylethyl, benzyl, etc.; aliphatic, haloaliphatic and cycloaliphatic such as alkyl, alkenyl, cycloalkyl, haloalkyl, including methyl, ethyl, propyl, chlorobutyl, cyclohexyl, etc.; cyanoalkyl radicals such as cyanoethyl cyanopropyl, cyanobutyl, etc. Radicals included by R' of Formula 2 are alkenyl radicals, cycloalkenyl radicals, and aralkenyl such as vinyl, allyl, cyclohexenyl, styryl, phenyl-2-propenyl, etc. Radicals included by R'' are hydrogen, alkyl and cycloalkyl radicals such as methyl, ethyl, butyl, octyl, cyclobutyl, cyclohexyl, etc.; aromatic radicals such as phenyl, phenylethyl, naphthyl, etc. Radicals included by R''' are ethylene, trimethylene, tetramethylene, etc. Radicals included by X are oxymethyl, methoxy, ethoxy, propoxy, etc., methoxymethoxy, ethoxymethoxy, ethoxyphenoxy, etc., acetoxy, propionoxy, etc., chloro, bromo, etc. Radicals included by Y are all of the X and R'' radicals previously defined. R, R', R'', R''', X and Y, separately can be all the same radical or any two or more of the aforementioned R, R', R'', R''', X and Y radicals. R is preferably a mixture of methyl, and vinyl, or a mixture of methyl, phenyl, and vinyl; R' is preferably vinyl; R'' is preferably methyl; R''' is preferably ethylene; X is preferably oxyethyl; Y is preferably methyl.

The organopolysiloxane polymers convertible to the cured, solid, elastomeric state operable in the present invention as shown by Formula 1, can be viscous masses or gummy solids depending upon such factors as the state of condensation of the starting organopolysiloxane, polymerizing agent, etc. Typical of the various organopolysiloxanes which can be employed in the practice of the present invention are those organopolysiloxanes disclosed and claimed in Agens Patent 2,448,756, Sprung et al. Patent 2,448,556, Sprung Patent 2,484,595, Krieble et al. Patent 2,457,688, Marsden Patent 2,521,528, Warrick Patent 2,541,137, and Hyde Patent 2,490,357.

The organopolysiloxane polymers can be made for example, by conventional hydrolysis of diorganodihalosilanes, or equilibration in the presence of an alkali-metal catalyst of cyclopolydiorganosiloxanes or mixtures thereof, to provide for the production of polymers having an average of from about 1.95 to 2.01, and preferably from about 1.98 to 2.01 organic radicals per silicon atom. The polymers of Formula 1 preferably contain from 0.1 to 1.0 mole percent of chemically combined diorganosiloxy units having alkenyl radicals attached to silicon by carbon-silicon linkages such as methylvinyl, or phenylvinyl siloxy units.

The starting cyclopolydiorangosiloxane used to make the polymers of Formula 1, which ultimately can be converted to the cured, solid, elastic state, are preferably composed of chemically combined polydiorganosiloxy units having the same or different organo radicals attached to silicon by carbon-silicon linkages. For example, a polydiorganosiloxane that can be employed in preparing the organopolysiloxane polymer of Formula 1 can consist of dimethylsiloxane units alone, dimethylsiloxane units and diphenylsiloxane units; dimethylsiloxane units, diphenylsiloxane units, and methylvinylsiloxane units; dimethylsiloxane units, diphenylsiloxane units, and methyl-β-cyanoethylsiloxane units, etc.

Although a number of different types of organopolysiloxane polymers have been specifically described for use in the present invention, it should be understood that any organopolysiloxane polymer within the scope of Formula 1 can be employed in the present invention.

A preferred form of the silanes of Formula 2 have the formula (4)

where $b$, $c$, $R''$ and X are as defined above, and Z is a member selected from vinyl, allyl, cyclohexenyl and alkyl substituted derivatives thereof. For example, if Z is a vinyl radical it can be $CYH=C(Y)-$, where Y is a member selected from hydrogen, and an alkyl radical, such as methyl, ethyl, propyl, etc. If Z is allyl, it can be also $CYH=CY-CY_2-$, where Y is as previously defined, etc. Silanes included by Formula 4 are for example, vinyltriethoxysilane, methylvinyldiethoxysilane, dimethylvinylethoxysilane, vinyltris(2-methoxyethoxy)silane, vinyltris(2-ethoxyethoxy)silane, allyltriethoxy silane, methylallyldiethoxysilane, dimethylallylethoxysilane, cyclohexenyltriethoxysilane, etc. A preferred form of the cyclic silane esters of Formula 3 have the formula, (5)
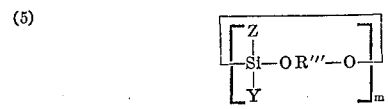

where $R'''$, Y, and Z are as defined above, and $m$ is an integer equal to from 1 to 3, inclusive. For example, cyclic esters that are included are monomeric methylvinylethylenedioxysilane, dimeric methylvinylethylenedioxysaline, trimeric ethylallylpropylenedioxysilane, etc. Additional examples of cyclic silane esters included by Formula 5 are shown in the copending application of Paul F. Silva, Ser. No. 15,552, filed Mar. 17, 1960, and assigned to the same assignee as the present invention.

The fillers that can be employed with the polymers of Formula 1 in the production of the compositions of the present invention are known to the art as reinforcing, and semireinforcing fillers. Reinforcing fillers that can be employed are for example, the silica fillers such as fumed silica, precipitated silica, silcon aerogel, and the like. Depending on the method of manufacture these fillers can contain or be free of adsorbed moisture, and can contain chemically bonded hydroxy groups. The preferred reinforcing filler is fumed silica which can be further modified in accordance with the teaching of Lucas Patent 2,938,009 assigned to the same assignee as the present invention.

Examples of other silica reinforcing fillers may be found described in U.S. Patents 2,541,137, 2,610,167, and 2,657,149. Such fillers may be slightly acidic or alkaline (that is, have pH's below or above 7) depending upon the method of manufacture, such as by an aerogel process. Examples of semireinforcing, or usually nonstructure forming type, are titanium oxide, lithopone, finely divided quartz, calcium carbonate, iron oxide, and diatomaceous earth.

Various curing agents that can be employed to effect more rapid conversion of the aforementioned organopolysiloxane polymers, to the cured, solid, elastic state are for example dibenzoyl peroxide, tertiary butyl perbenzoate, bis-(2,4 - dichlorobenzoyl) peroxide, ditertiarybutyl peroxide, dicumyl peroxide, etc. These curing agents, or vulcanization accelerators, as they are often designated, can be present in the organopolysiloxane compositions in amounts ranging from about 0.1 to as high as 4 to 8 parts, or more, based on 100 parts of the organopolysiloxane polymer of Formula 1. High energy electron irradiation without curing agents can also be employed to convert the organopolysolixane to the cured, solid, elastic state.

In addition to fillers, curing catalyst, etc. the organopolysiloxane compositions of the present invention can also contain various structure control additives, pigments, heat stabilizers, etc. Examples of structure control additives that can be employed are silanol-stopped and alkoxy-stopped diorganosilanes and polydiorganosiloxanes, such as diphenylsilanediol, silanol-stopped polydimethylsiloxane, and alkoxy-stopped polydimethylsiloxanes, etc. The silanol-stopped polydiorganosiloxane structure control additives can have viscosities ranging from 10 to 50 centipoises at 25° C., a silanol content of from 5 mole to 15 mole percent, and can be utilized in proportions of from 5 to 15 parts, per 100 parts of the polymer of Formula 1. Also included are heat stabilizers such as iron oxide, aryl urethanes, etc. which can be employed in proportions of up to 5 parts per 100 parts of polymer.

In the practice of the invention, the organopolysiloxane composition is produced by forming a mixture of the organopolysiloxane polymer, filler, olefinically unsaturated organosilicon material, structure control additive, heat stabilizer, etc. The order of addition of the various ingredients is not critical. For example, the various ingredients of the mixture can be blended together by use of standard rubber mixing equipment such as doughmixer, rubber mill, Waring blender, and the like. One procedure for example, is to add the filler to the polymer while it is being milled followed by the addition of the olefinically unsaturated organosilicon material, heat stabilizers, plasticizers, curing catalyst, etc. Another procedure that can be employed is to doughmix the polymer and filler, and add the olefinically unsaturated organosilicon material, curing catalyst, etc. to the polymer-filler blend while it is milled on a rubber mill. Those skilled in the art would know, depending upon the properties desired in the final cured product and applications to which the cured product is to be employed, the nature, and amount of the particular ingredients utilized, and manner of blending, to produce the desired organopolysiloxane composition.

The organopolysiloxane composition can be converted to the solid, elastomeric state at temperatures in the range of from 80° C. to 650° C., depending upon the nature of the curing catalyst, duration of cure, amount and type of filler, etc. The direct conversion of the organopolysiloxane composition to the cured, solid, elastic state can be effected as the result of the conditions normally utilized during conventional molding, extrusion and calendering operations. For example, depending upon the curing catalyst used, a temperature of 80° C. to 300° C. can be employed for compression and transfer molding for either 30 minutes or more, or 1 minute or less. Hot air vulcanization at temperatures from 150° C. to 650° C. or steam vulcanization at temperatures between 110° C. to 210° C. can be employed for periods of from five to ten minutes, or a matter of seconds during extrusion operation, again depending upon the curing catalyst used.

Those skilled in the art would know, in view of the application for which the cured product is intended, the particular means to be utilized in any particular situation. If desired, the cured product of the present invention can be oven cured, following the fabrication treatment, after it has achieved optimum properties without adverse effects.

In order that those skilled in the art will be better able to understand the practice of the present invention, the following examples are given by way of illustration and not by way of limitation. All parts are by weight.

*Example 1*

An organopolysiloxane composition of the present invention was made by blending in a doughmixer at a temperature of about 150° C., a mixture composed of 61.6 parts of a copolymer of methylvinylsiloxy units and dimethylsiloxy units, 23.6 parts of fumed silica, 37 parts of heat expanded ground perlite, 1.8 parts of iron oxide, 0.6 part of vinyl triethoxy silane, and 5.5 parts of a structure control additive in the form of a methoxy-chain-stopped copolymer of dimethylsiloxy units and diphenylsiloxy units. There was added to 100 parts of the resulting mixture, while it was milled at room temperature on a two roll mill, 0.4 part of dicumyl peroxide, which was adsorbed on the surface of finely powdered calcium carbonate. In addition, an organopolysiloxane composition was also prepared free of vinyl triethoxy silane following the same procedure.

The organopolysiloxane polymer utilized in forming the above organopolysiloxane compositions was prepared by heating a mixture of 100 parts of octamethylcyclotetrasiloxane, 0.115 part of tetramethyltetravinylcyclotetrasiloxane and about 1/10 part of tetramethyldivinyldisiloxane in the presence of 0.01 part of potassium hydroxide at a temperature in the range of between about 150° C. to 165° C. while the mixture was agitated. After a period of about 4 hours, the reaction was stopped and there was recovered a polydimethylsiloxane polymer having a minor amount of vinyl radicals attached to silicon through carbon-silicon linkages and a viscosity of about $7 \times 10^6$ centipoises at 25° C.

Portions of the previously described composition of the present invention and the composition free of vinyl triethoxy silane were molded into slabs at a temperature of 160° C. for about 10 minutes. These slabs were then tested for physical properties in accordance with prescribed A.S.T.M. procedures. The physical properties of slabs of the composition of the present invention and the composition free of vinyl triethoxy silane were also tested after they had an initial heat treatment at 160° C. for 10 minutes and a post-cure of 4 hours at 250° C.

In addition to forming cured slabs, the compositions of Example 1, containing the vinyltriethoxysilane, and the composition free of the vinyltriethoxy silane were measured for rate of cure in terms of "Scorch Time," by the Shearing Disk Viscometer method as specified in A.S.T.M. D1646–59T. Scorch time indicates the time required to effect a specific increase in the viscosity of the sample during its incipient cure. Accordingly, a decrease in the scorch time of a sample would indicate that the rate of cure of the sample was faster.

Table I below shows the results of the test for both the slabs made from the compositions of the present invention and the slab made from the composition free of vinyl triethoxy silane. In the table "H" is Hardness (Shore A), "T" is Tensile Strength (p.s.i.), "E" is Elongation (percent), and "CS" is Compression Set. The compression set of the slabs was determined by compressing the slabs to 75% of their original thickness for a period of 22 hours at about 170° C. The compression set values in the table represent the percent of the 25% deformation remaining permanently in the slab after the test period. Scorch Time (S.T.) shows the number of seconds required to raise the viscosity of the particular sample charged to the viscometer to a predetermined maximum. It was measured from the time the sample achieved a minimum viscosity (M.V.) to the time it took the sample to increase 25 Mooney Viscosity units, as shown by the viscometer which was maintained at 150° C.

Example 2

An organopolysiloxane composition was made by adding 0.5 part of monomeric methylvinyldioxyethlene silane, 2 parts of diphenyldiethoxysilane, and 1.3 parts of benzoyl peroxide to 220 parts of a mixture of the polymer of Example 1, composed of dimethyl siloxy units and methylvinyl siloxy units, fumed silica, and ground quartz, while the aforesaid mixture was milled on a two roll rubber mill. The polymer-filler mixture was prepared by blending together in a doughmixer, 100 parts of the polymer, 20 parts of fumed silica and 100 parts of ground quartz having an average particle size of about 10 microns. Slabs were prepared from the resulting composition following the procedure of Example 1 by press-curing them at 160° C. for 10 minutes.

Example 3

A composition was prepared following the procedure of Example 2, except that 0.5 part of tris(2-ethoxyethoxy)-vinyl silane was utilized in place of methylvinyldioxyethylene silane monomer.

Example 4

A composition was prepared in accordance with the procedure of Example 2 except that 0.5 part of allyl triethoxy silane was employed as the olefinically unsaturated organosilicon material.

Table II below shows the results obtained with slabs formed by press-curing for 10 minutes at 160° C. the organopolysiloxane composition of Example 2, containing 0.5 part per 100 parts of polymer of various olefinically unsaturated organosilicon materials of the present invention, as compared to similarly press-cured slabs of the same organopolysiloxane composition free of the olefinically unsaturated organosilicon material. In the table, H, T, and E have the same meaning as above.

TABLE II

| Olefinically Unsaturated Organosilicon Material | Press-Cured 10 Mins. at 160° C. | | |
|---|---|---|---|
| | H | T | E |
| None | 66 | 660 | 220 |
| Methylvinyldioxyethylene silane | 53 | 805 | 220 |
| Tris(2-ethoxyethoxy) vinyl silane | 55 | 920 | 290 |
| Allyltriethoxy silane | 64 | 810 | 200 |
| Vinyltriethoxy silane | 55 | 895 | 210 |

An organopolysiloxane composition was prepared following the procedure of Example 2, except that vinyltriethoxy silane was substituted for the methylvinyldioxyethylene silane monomer. Slabs were prepared from the composition that contained 0.1 part, 0.33 part, 0.5 part, 0.67 part, 1 part, 2 parts, 4 parts, and 5 parts of vinyltriethoxysilane based on 100 parts of the polymer in the composition. In addition, a slab was also prepared from a composition free of the vinyl triethoxy silane.

Table III shows the results obtained in terms of Hardness, Tensile and Elongation with the respective slabs following the same procedure as above.

TABLE I

| Parts of vinyltriethoxy per 100 of polymer | Molded 10 Mins. at 160° C. | | | | Cured 4 Hrs. at 250° C. | | | | Scorch Time at 150° C. | |
|---|---|---|---|---|---|---|---|---|---|---|
| | H | T | E | CS | H | T | E | CS | M.V. | S.T. (Sec.) |
| 0.6 | 80 | 1,195 | 130 | 22 | 83 | 1,105 | 90 | 23 | 32 | 224 |
| 0 | 71 | 630 | 270 | 50 | 80 | 1,190 | 130 | 22 | 30 | 301 |

TABLE III

| Parts per 100 parts of polymer of vinyltriethoxysilane | Press-Cured for 10 Mins. at 160° C. | | |
|---|---|---|---|
| | H | T | E |
| 0 | 66 | 375 | 125 |
| 0.1 | 69 | 420 | 130 |
| 0.33 | 68 | 580 | 110 |
| 0.5 | 68 | 520 | 120 |
| 0.67 | 70 | 630 | 110 |
| 1.0 | 69 | 700 | 125 |
| 2.0 | 69 | 720 | 120 |
| 4.0 | 69 | 680 | 100 |
| 5.0 | 58 | 750 | 180 |

Example 5

An organopolysiloxane composition of the present invention was prepared by mixing together in a doughmixer, 100 parts of the polymer of Example 1, 43 parts of fumed silica, and 3.5 parts of the structure control additive utilized in Example 1. There was added to 100 parts of the resulting mixture while it was being milled on a rubber mill, 68 parts of ground quartz, 1.50 parts of bis-(2,4-dichlorobenzoyl)peroxide) 0.34 part of vinyltriethoxy silane. Another organopolysiloxane composition of the present invention was prepared following the same procedure, except that 1.95 parts of the peroxide curing agent was employed. In addition to the aforesaid compositions, similar compositions were also made from each of the compositions free of the vinyltriethoxy silane.

Slabs were obtained from the above compositions from 30 mil thick sheets formed on a two roll mill, which were cured in hot air for 1 minute at 310° C. Table IV below shows the results obtained with the hot air vulcanized slab in terms of Hardness, Tensile, and Elongation, as defined above.

TABLE IV

| Parts Peroxide per 100 polymer | Parts Vinyltriethoxy Silane per 100 of polymer | Hot Air Vulcanized 1 Min. at 310° C. | | |
|---|---|---|---|---|
| | | H | T | E |
| 1.5 | 0 | 63 | 790 | 400 |
| | 0.34 | 60 | 965 | 320 |
| 1.95 | 0 | 65 | 680 | 280 |
| | 0.34 | 64 | 980 | 290 |

Based on the results shown in Tables I to IV above, one skilled in the art would know that the organopolysiloxane compositions of the present invention provide for significant advantages in applications requiring the employment of organopolysiloxanes convertible to the cured, solid, elastic state. These organopolysiloxane compositions, for example, as shown in Table I, can achieve optimum properties in a relatively short period of time, and resist change at elevated temperatures over an extended period of time. Table II shows that the olefinically unsaturated organosilicon material employed is effective in organopolysiloxane compositions convertible to the solid, elastic state, as long as it can provide for the production of a silane derivative that has an olefinically unsaturated hydrocarbon radical attached to silicon and at least one hydrolyzable group capable of forming a siloxy linkage. Table III shows that the olefinically unsaturated organosilicon material can be employed over a broad range in concentration. Table IV shows that the results obtained in the practice of the invention are principally dependent on the employment of the olefinically unsaturated organosilicon material in an operable range, and not critical with respect to level of curing catalyst employed, method of curing such as hot air vulcanization, temperature, etc.

While the foregoing examples have of necessity been limited to only a few of the many variables within the scope of the present invention, it should be understood that the present invention covers a much broader class of organopolysiloxane compositions containing the polymer of Formula 1, and olefinically unsaturated organosilicon materials of Formulae 2 and 3.

What I claim as new and desire to secure by Letters Patent of the United States is:

1. A composition curable at temperatures in the range of between 80° C. to 650° C. comprising by weight (1) 100 parts of an organopolysiloxane polymer having a viscosity of at least 100,000 centipoises at 25° C. of the formula, $$(R)_a SiO_{\frac{4-a}{2}}$$

(2) 10 to 300 parts of a filler selected from the class consisting of reinforcing fillers, semi-reinforcing fillers, and mixtures thereof, and (3) 0.1 to 5 parts of an olefinically unsaturated organosilane of the formula, $$R'-\underset{\underset{R'}{|}}{Si}-(X)_c$$

where R is a member selected from the class consisting of monovalent hydrocarbon radicals, halogenated monovalent hydrocarbon radicals, and cyanoalkyl radicals, R' is an olefinically unsaturated monovalent hydrocarbon radical, R'' is a member selected from the class consisting of hydrogen, and monovalent hydrocarbon radicals free of olefinic unsaturation, X is a member selected from the class consisting of alkoxy radicals, alkoxyalkoxy radicals, alkoxyaryloxy radicals, and acyloxy radicals, $a$ is equal to 1.95 to 2.01 inclusive, $b$ is a whole number equal to 0 to 2 inclusive, $c$ is an integer equal to from 1 to 3 inclusive, and the sum of $b$ and $c$ is equal to 3.

2. A composition in accordance with claim 1, containing from 0.1 to 8 parts of a peroxide curing catalyst per 100 parts of organopolysiloxane polymer.

3. A composition in accordance with claim 1, where said silane is vinyl triethoxy silane.

4. A composition in accordance with claim 1, where the silane is allyl triethoxy silane.

5. A composition in accordance with claim 1, where the silane is methylvinyldiethoxy silane.

6. A composition in accordance with claim 1, where the filler is a mixture of reinforcing filler and semi-reinforcing filler.

7. A composition curable at temperatures in the range of between 80° C. to 650° C. comprising by weight (1) 100 parts of an organopolysiloxane polymer having a viscosity of at least 100,000 centipoises at 25° C. of the formula, $$(R)_a SiO_{\left(\frac{4-a}{2}\right)}$$

(2) 10 to 300 parts of filler comprising a mixture of fumed silica and perlite, and (3) 0.1 to 5 parts of vinyltriethoxy silane, where R is a member selected from the class consisting of monovalent hydrocarbon radicals, halogenated monovalent hydrocarbon radicals, and cyanoalkyl radicals and $a$ is equal to 1.95 to 2.01 inclusive.

8. A composition curable at temperatures in the range of between 80° C. to 650° C. comprising by weight (1) 100 parts of an organopolysiloxane polymer having a viscosity of at least 100,000 centipoises at 25° C. of the formula, $$(R)_a SiO_{\left(\frac{4-a}{2}\right)}$$

(2) 10 to 300 parts of filler comprising a mixture of fumed silica and ground quartz, and (3) 0.1 to 5 parts of vinyltriethoxy silane, where R is a member selected from the class consisting of monovalent hydrocarbon radicals, halogenated monovalent hydrocarbon radicals, and cyanoalkyl radicals and $a$ is equal to 1.95 to 2.01 inclusive.

9. The composition in accordance with claim 1, where the filler is a mixture of fumed silica and diatomaceous earth.

10. A composition in accordance with claim 1 where the organosilane is tris-(2-methoxyethoxy)vinyl silane.

11. A process comprising mixing together by weight (1) 100 parts of an organopolysiloxane polymer having a viscosity of at least 100,000 centipoises at 25° C. of the formula,

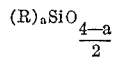

(2) 10 to 300 parts of a filler selected from the class consisting of reinforcing fillers, semi-reinforcing fillers, and mixtures thereof, and (3) 0.1 to 5 parts of an olefinically unsaturated organosilane of the formula,

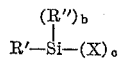

where R is a member selected from the class consisting of monovalent hydrocarbon radicals, halogenated monovalent hydrocarbon radicals, and cyanoalkyl radicals, R' is an olefinically unsaturated monovalent hydrocarbon radical, R'' is a member selected from the class consisting of hydrogen, and monovalent hydrocarbon radicals free of olefinic unsaturation, X is a member selected from the class consisting of alkoxy radicals, alkoxyalkoxy radicals, alkoxyaryloxy radicals, and acyloxy radicals, $a$ is equal to 1.95 to 2.01 inclusive, $b$ is a whole number equal to 0 to 2 inclusive, $c$ is an integer equal to form 1 to 3 inclusive, and the sum of $b$ and $c$ is equal to 3.

References Cited

UNITED STATES PATENTS

| | | | |
|---|---|---|---|
| 2,610,167 | 9/1952 | Te Grotenhuis | 260—37 |
| 2,890,188 | 6/1959 | Konkle et al. | 260—37 |
| 2,967,168 | 1/1961 | Hurd | 260—37 |
| 2,993,809 | 7/1961 | Bueche et al. | 260—37 XR |
| 3,062,242 | 11/1962 | Vanderbilt | 260—448.8 XR |
| 3,065,254 | 11/1962 | Silva | 260—37 XR |
| 3,128,196 | 4/1964 | Pierpont | 260—37 |

FOREIGN PATENTS

| | | |
|---|---|---|
| 603,288 | 8/1960 | Canada. |

JULIUS FROME, *Primary Examiner.*

MORRIS LIEBMAN, *Examiner.*

A. H. KOECKERT, J. E. CALLAGHAN, *Assistant Examiners.*